July 5, 1927.
S. J. BENS
1,634,646
WHEEL OR SPROCKET SHEAVE
Original Filed April 23, 1921
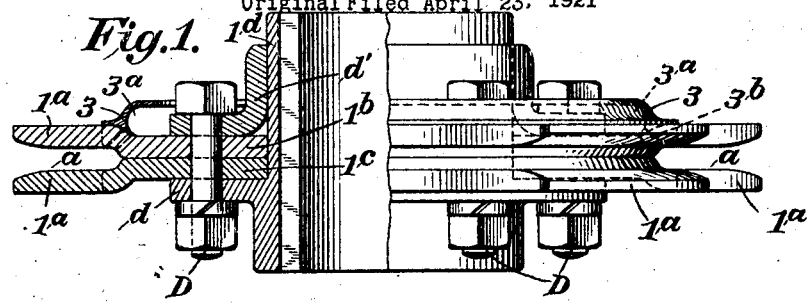
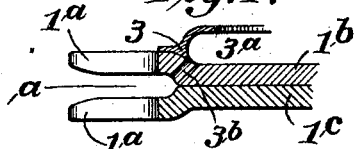
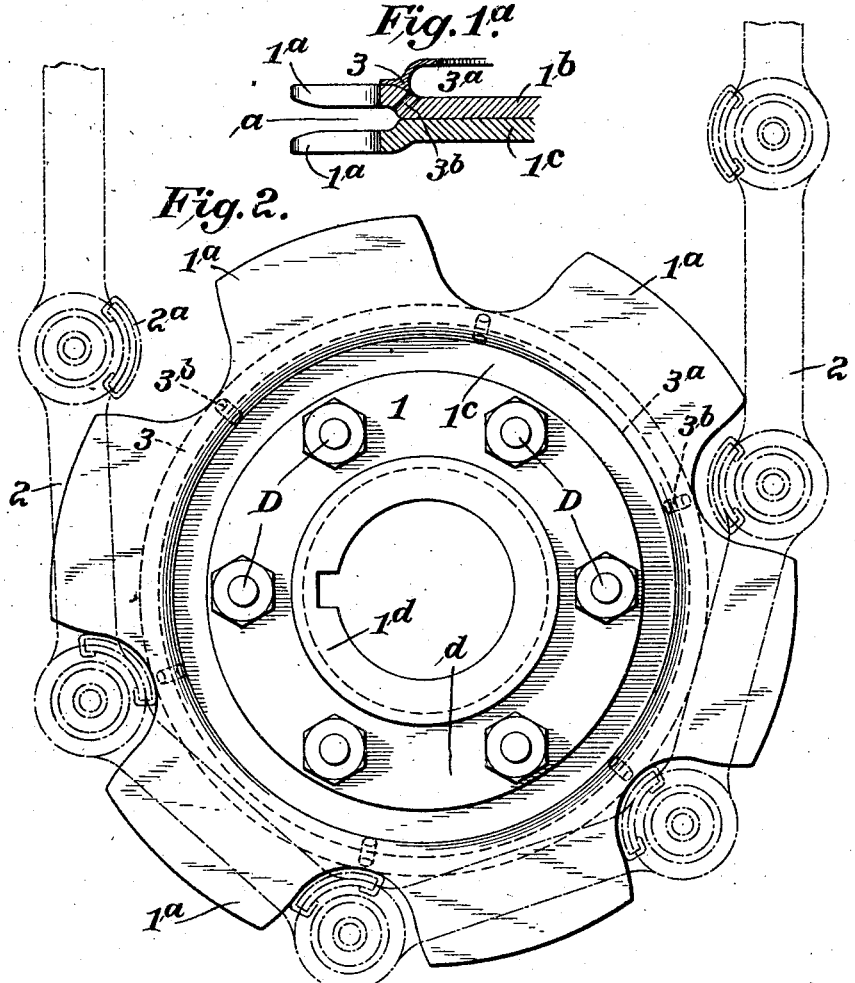
Inventor:
Samuel J. Bens, Patented July 5, 1927.

1,634,646

UNITED STATES PATENT OFFICE.

SAMUEL J. BENS, OF NEW YORK, N. Y., ASSIGNOR TO CHAIN SAW CORPORATION, OF WILMINGTON, DELAWARE, A CORPORATION OF DELAWARE.

WHEEL OR SPROCKET SHEAVE.

Substitute for application Serial No. 463,834, filed April 23, 1921. This application filed November 16, 1926. Serial No. 148,763.

My present invention relates to improvements, in wheels or sprocket sheaves designed for chain or link belt transmissions, and aims to provide a single form of construction which may be easily and economically manufactured, which will be strong and durable in use and subject to a minimum amount of wear, and which will be provided with simple and efficient lubricating means.

With these and other objects in view the invention includes the novel features of construction and arrangement and combination of parts hereinafter described and particularly defined by the appended claims.

My preferred embodiment of the invention is illustrated in the accompanying drawing in which—

Figure 1 is a part transverse sectional view and part elevation of the wheel.

Figure 1$^a$ is a sectional detail, and

Figure 2 is a side elevation of the wheel with the chain in position thereon in dot and dash lines.

Referring by reference characters to this drawing the numeral 1 designates the wheel or sheave which is shown as a toothed sprocket designed to cooperate with the sprocket chain 2 which is preferably of the construction shown in an application filed by me of even date herewith. This chain has oppositely disposed contact portions 2$^a$ designed to be engaged by pairs of spaced teeth 1$^a$ on the sprocket, which teeth straddle the links, the spaces between the teeth serving as a guide for the chain links. The wheel comprises two discs which may be conveniently formed of sheet metal stamped or pressed into the desired shape which are designated respectively 1$^b$ and 1$^c$. The discs are provided with aligning central apertures which receive the central hub 1$^d$ which is provided with an annular flange $d$ against which one of the discs abuts. A removable flange $d'$, preferably of substantially L shape in cross section, is slipped upon the hub and bears against the outer face of the other disc, the parts being held together by bolts or other suitable fastening means as indicated at D. The outer portions of the discs carrying or forming the teeth 1$^a$ are swaged or pressed outwardly providing intervening link receiving spaces $a$.

In order to lubricate the links of the chain and also the points of contact between the chain and wheel or sheave I provide an annular oil receiving channel 3$^a$ into which oil may be fed by any suitable means and from which it is fed to the space between the teeth by ducts 3$^b$. This channel may be conveniently formed by a suitably shaped annular channel strip 3 secured to one of the pulley faces in any suitable manner as for example by spot welding. It will be understood that the oil would be fed to the channel on the under side of the wheel axis and would be held in the channel and fed through the ducts by centrifugal action. An important feature of this manner of lubrication is that not only are the pivots of the chain and the points of contact thereof with the wheel or sheave properly lubricated, but the side faces of the links will also be oiled which is of special importance in connection with chain saws for which my present invention is more especially designed though not limited to such use. In such chain saws operating in resinous wood the lubricating of the faces of the links is an absolute necessity and has heretofore been a problem which has caused a great deal of trouble.

As will be evident to those skilled in the art, my invention permits of various modifications without departing from the spirit thereof or the scope of the appended claims.

This application is based upon my application No. 463,834, filed April 23, 1921, allowed July 21, 1923, and now held among the abandoned files.

Having thus described my invention what I claim is:

1. A pulley or sheave for sprocket chains or link belts comprising a wheel having an annular oil receiving channel adjacent the rim thereof, and open towards the axis of the wheel and ports or passages leading from said channel to the chain carrying portion of the wheel.

2. A pulley or sheave for sprocket chains or link belts having an annular channel on one face thereof open towards the axis of the wheel and ports or ducts leading from said channel to chain carrying portion of the wheel.

3. A pulley or sheave or sprocket chains or link belts comprising a wheel having an annular chain seat, and an annular trough shaped ring secured to one face of the pulley and forming an oil channel open towards the axis of the pulley, said pulley having oil ducts leading from said channel to the chain seat.

4. A pulley or sheave for sprocket chains or link belts having two sets of spaced peripheral teeth, an annular trough shaped ring secured to one face of the pulley adjacent the base of the teeth on one side and forming an oil channel open towards the axis of the pulley, said pulley having oil ducts leading from said channel to the spaces between the teeth.

In testimony whereof, I affix my signature.

SAMUEL J. BENS.